Jan. 4, 1966   K. W. KAMPERT   3,227,300
ATTACHMENTS FOR TRACTOR LOADER
Filed Dec. 21, 1962   2 Sheets-Sheet 1

INVENTOR.
KEITH W. KAMPERT
BY
ATTY.

Jan. 4, 1966 K. W. KAMPERT 3,227,300
ATTACHMENTS FOR TRACTOR LOADER
Filed Dec. 21, 1962 2 Sheets-Sheet 2

INVENTOR.
KEITH W. KAMPERT
BY
ATTY.

United States Patent Office 3,227,300
Patented Jan. 4, 1966

3,227,300
ATTACHMENTS FOR TRACTOR LOADER
Keith W. Kampert, Libertyville, Ill., assignor to The
Frank G. Hough Co., a corporation of Illinois
Filed Dec. 21, 1962, Ser. No. 246,578
2 Claims. (Cl. 214—674)

This invention relates generally to attachments for a front-end type tractor loader, and more particularly to a novel attachment assembly providing for the simple conversion of a front-end type tractor loader to certain other types of tractor supported implements.

The primary object of the present invention is to provide a novel attachment assembly for a front-end type tractor loader which will permit the relatively simple conversion of a front-end type tractor loader into other types of tractor supported implements.

It is a further object to provide a novel attachment assembly for converting a front-end type tractor loader into other types of tractor supported implements using the same tractor connections for the attachment assembly to the tractor as the tractor connections for the connection of a front-end loader to the tractor.

It is a further object to provide a novel arrangement for a tractor which will permit any one of a number of tools or implements to be interchangeably carried on and supported by the tractor.

It is still another object to provide a novel attachment assembly for converting a front-end type tractor loader into a vertical-mast fork lift truck.

It is still another object to provide a novel attachment assembly for converting a front-end type tractor loader into a front-pusher vehicle for pushing and pulling railroad cars.

Other objects and features of the present invention will be apparent upon a perusal of the following specification and drawings in which.

The present embodiments are the preferred embodiments, but it is to be understood that changes can be made in the present embodiments by one skilled in the art without departing from the spirit and scope of the present invention.

Figure 1:
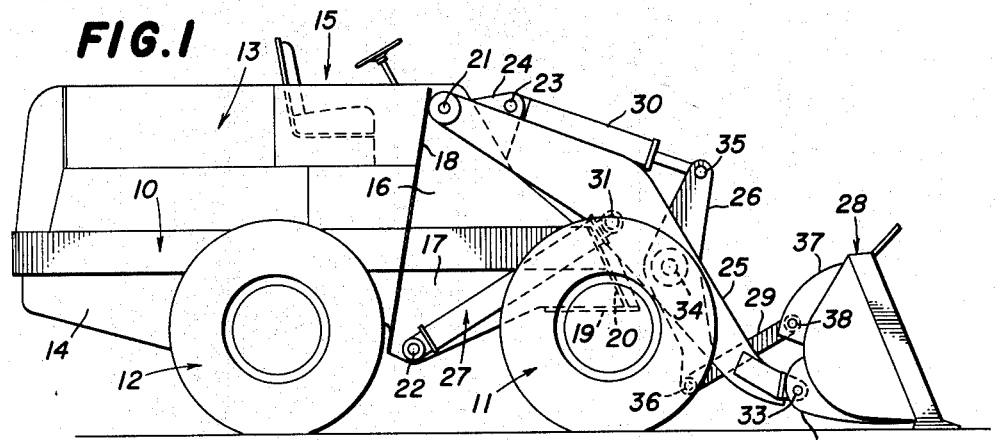
FIGURE 1 is a side elevational view of a certain front-end type tractor loader construction.

Generally, the subject invention comprises two embodiments of a novel attachment assembly which permits the easy conversion of a front-end type tractor loader such as shown in FIGURE 1 to other types of tractor supported implements such as the vertical-lift mast fork lift or a front-end pusher structure.

The front-end type tractor loader of FIGURE 1 comprises a tractor having a front-end loader operatively carried thereon. As an alternative to the rigid frame tractor shown, the tractor can also be of the articulated type. The loader structure is connected to the forward portion of the tractor at what amounts to three points, two of the points being duplicated on each side of the tractor. The rear end of the boom structure is pivotally mounted at one point on the tractor, the rearward end of the boom ram is connected at another point to the tractor, and the rearward end of the bucket ram, which controls the position of the bucket relative to the boom, is connected to the tractor at a third point. The novel attachment assembly of the present invention permits the mounting of other tractor supported devices on the tractor merely through the use of the three described points of connection of the loader structure to the tractor.

The conversion of a front-end type tractor loader to other types of tractor supported implements is not as simple as might on first consideration appear. In the connection of a device such as a vertical-lift mast to a tractor to provide a lift truck construction, consideration must be given to the ability of the complete lift truck to engage and to lift a substantial load throughout a relatively great vertical range, and to carry the load to a remote location, while maintaining all of the desirable factors of stability and efficiency for the intended functions of such an implement. The problems of producing a stable and efficient lift truck construction become quite complicated when the vertical-lift mast is connected to the established connection points of a front-end type loader on a tractor. The problems of providing a front-end pusher structure for railroad cars is complicated by the large reaction forces which are applied to a tractor in the pushing of railroad cars.

The present invention contemplates a certain frame assembly which is connected at the rearward end thereof to the pins which normally carry the boom ram of the loader structure, with the frame assembly extending beneath the axle assembly of the forward wheels of the tractor and forwardly thereof. In the case of the vertical mast forklift structure, the lower end of the vertical mast is pivotally connected to the forward end of the frame. Similarly, the front-end pusher structure is secured to the forward end of the frame.

In the fork-lift truck, the frame is maintained in a fixed position relative to the tractor by a pair of links which are connected between the forward end of the frame and the pivot pins for the boom structure of the loader on the tractor. In the front-end pusher structure, the forward end of the frame is supported by a link which is connected between the upper rearward side of the pusher structure and the pin assembly for the connection of the bucket-tilting ram of the loader structure to the tractor. The pin assembly and the bucket-tilting ram for the loader structure are used to provide means for tilting the vertical-lift mast relative to the frame.

In detail, the front-end type tractor loader of the present embodiment of the invention comprises a frame 10 which is carried on forward and rearward axle assemblies, which in turn are respectively supported on the forward wheels 11 and rearward wheels 12. Rather than having a rigid frame and steerable wheels, the frame may be formed in two sections pivotally interconnected on a vertical axis to form an articulated tractor. An engine compartment 13 is carried on the rearward end of the frame 10. A counterweight 14 is secured to the rearward end of the frame 10 to depend therefrom. An operator's compartment 15 is carried on the frame 10 forwardly of the engine compartment 13. The forward end of the frame 10 is adapted to receive the loader structure. The forward end of the tractor includes a pair of upstanding plates 16, one on each side of the tractor and carried on the frame 10, and a pair of plates 17 disposed one on each side of the tractor and depending from the forward end of the frame 10. The plates 16 and 17 and the frame 10 are formed as an integral unit by a number of reinforcing plates 18, 19 and 20.

Each plate 16 is provided at the upper end thereof with a horizontally outwardly extending pin 21. Each plate 17 is provided at the lower end thereof with a horizontally outwardly extending pin 22. A pin 23 is carried between a pair of flanges 24, which in turn are secured to the upper forward end of the tractor and substantially at the transverse center thereof.

The loader structure comprises a pair of boom arms 25, a lever assembly 26, a pair of boom hydraulic rams 27, a bucket 28, a link assembly 29, and a bucket hydraulic ram 30.

The rearward end of each boom arm 25 is pivotally carried on one of the pins 21. The other ends of the boom arms 25 extend forwardly of the tractor. The rearward end of each boom hydraulic ram 27 is pivotally carried on one of the pins 22. The other end of each hydraulic ram 27 is pivotally connected to one of the boom arms 25 intermediate the ends thereof by pin means 31. Thus it may be seen that the boom arms 25 may be raised and lowered by appropriate extensions and retractions of the boom hydraulic rams 27.

The bucket 28 is provided with a plurality of flanges 32 on the lower rearward side thereof. The bucket 28 is pivotally carried on the forward end of the boom arms 25 by pin means 33 extending through the forward ends of the boom arms 25 and the flanges 32.

The pivotal position of the bucket 28 relative to the boom arms 25 is determined by the arrangement of the bucket tilting ram 30, the lever assembly 26, and the link assembly 29. The lever assembly 26 is pivotally carried between the boom arms 25 intermediate the ends thereof by pin means 34. One end of the lever assembly 26 extends generally upwardly of the boom arms 25 with the other end of the lever assembly 26 extending generally downwardly of the boom arms 25. The upper end of the lever assembly 26 is pivotally connected to one end of the bucket tilting hydraulic ram 30 by pin means 35. The other end of the hydraulic ram 30 is pivotally carried on the pin 23. The lower end of the lever assembly 26 is pivotally connected to one end of the link assembly 29 by pin means 36. The other end of the link assembly 29 is pivotally connected to a flange assembly 37 by pin means 38. The flange assembly 37 is secured to the upward rearward side of the bucket 28.

The above described front-end type tractor loader is operated by an operator from the operator's compartment 15 through selected movements of the tractor and extensions and retractions of the hydraulic rams 27 and 30. The hydraulic rams 27 and 30 are extended and retracted by any suitable hydraulic pump, valve and conduit means (not shown). When the rams 27 are substantially completely retracted and the ram 30 is partially extended such as shown in FIGURE 1, the tractor loader is prepared for digging at ground level. This is accomplished by moving the tractor forwardly to project the cutting edge of the bucket 28 into a bank or pile of material. During filling of the bucket, the hydraulic ram 30 may be extended to pivot the bucket rearwardly to break away any material in the bucket from the remainder of the bank or pile. By a partial extension of the hydraulic rams 28 may be positioned in a convenient carrying position and the loaded bucket may then be transported to a remote location for dumping. The relative positions of the pins 21, 22 and 23 provide for an efficient combination of a loader and a tractor considering the various forces which are applied to the tractor and the loader by operation of the tractor and the hydraulic rams 27 and 30 and the reaction forces which are applied to the tractor and loader by any material being worked.

Figure 2:
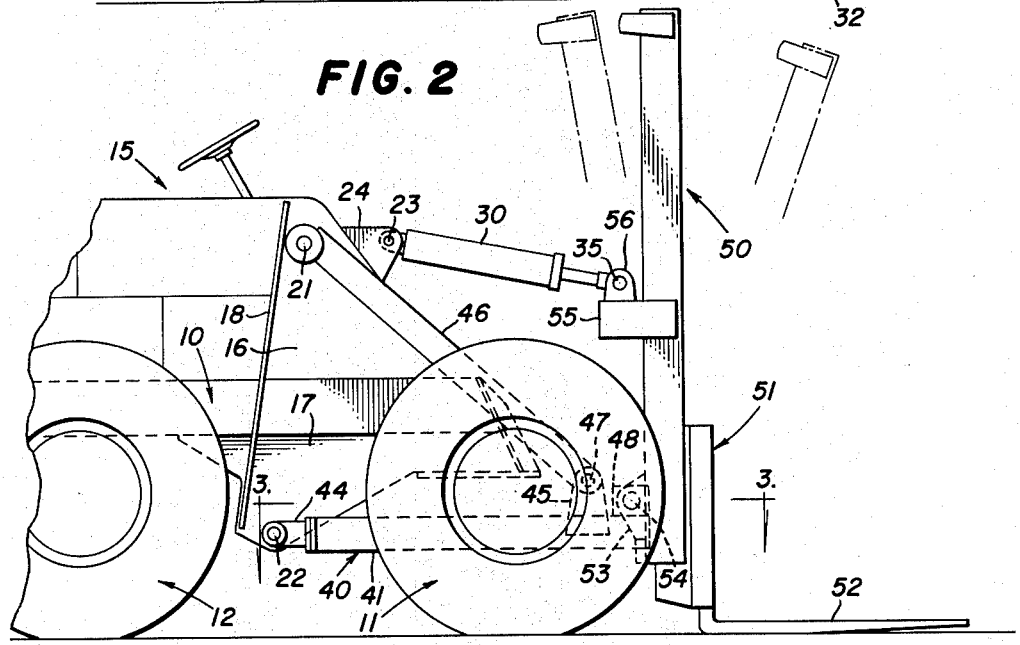
FIGURE 2 is a view similar to FIGURE 1 but showing a vertical-lift mast fork lift substituted for the loader structure of FIGURE 1.
Figure 3:
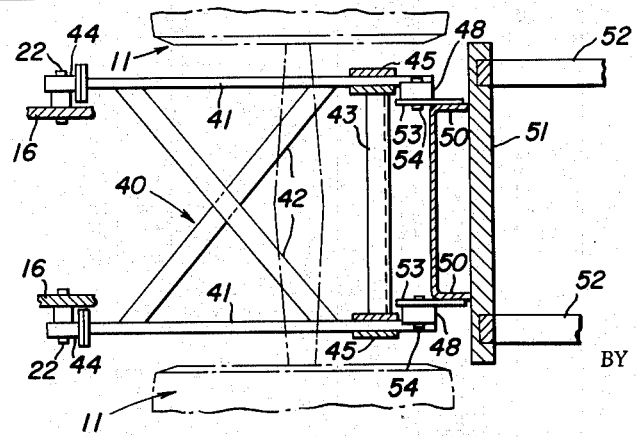
FIGURE 3 is a partial view of the structure shown in FIGURE 2 and taken substantially along the line 3—3 of FIGURE 2.

In the fork lift truck arrangement shown in FIGURES 2 and 3, all of the loader structure of FIGURE 1 except the hydraulic ram 30 has been removed by a disconnection of the loader structure at pins 21, 22 and 35.

The basic support for the fork lift structure on the tractor is the frame assembly 40. The frame assembly 40 comprises a pair of spaced apart beams 41, a pair of crossed braces 42, and a transverse brace 43. The crossed braces 42 are secured between the beams 41 to transversely space the beams 41 a distance substantially equal to the transverse spacing between pins 22. The transverse brace 43 is secured between the forward portions of the beams 41. A flange member 44 is secured to the rearward end of each beam 41. The flanges 44 permit the frame 40 to be pivotally carried at its rearward end on the pins 22 of the tractor. From the pins 22, the frame 40 extends forwardly between the forward wheels 11 and beneath the axle assembly for the forward wheels 11. An upwardly extending flange 45 is secured to the forward end portion of each beam 41 in substantial longitudinal alignment with the transverse brace 43.

A pair of links 46 are provided for supporting the forward end of the frame 40. One end of each of the links 46 is connected to the upper end of one of the flanges 45 by pin means 47. The other end of each link 46 is carried on one of the pins 21 on the tractor. The links 46 are of such a length that the frame 40 is maintained in substantial horizontal alignment beneath the axle assembly of the forward wheels 11 of the tractor.

The forward end of each beam 41 of the frame 40 is provided with a flange 48 for pivotally supporting the forward end of a vertical mast 50. The vertical mast 50 comprises a vertical rail structure which slidably carries a fork assembly 51. The fork assembly 51 is provided with horizontally extending tines 52. Any suitable means (not shown) may be provided for raising and lowering the fork assembly 51 in the rail structure of the vertical mast 50. Some portion of the hydraulic means for operating the loader may be used for operating the fork assembly 51.

The lower end of the vertical mast 50 is provided with a pair of transversely spaced apart rearwardly extending flanges 53. The flanges 53 are pivotally connected to the flanges 48 of the frame 40 by pins 54.

A transversely and rearwardly extending brace member 55 is secured to the vertical mast 50 intermediate the ends thereof. Substantially at the center of the brace member 55, a flange 56 is secured to the upper side thereof. The forward end of the hydraulic ram 30 is pivotally connected to the flange 56 by pin means 35.

The above described fork lift truck is also operated by an operator from the operator's compartment 15 through selected movements of the tractor, extensions and retractions of the hydraulic ram 30, and by appropriate raising and lowering of the fork assembly 51. When the ram 30 is partially extended and the fork assembly 51 is lowered to ground level, such as shown in FIGURE 2, the fork lift truck is prepared to receive a load at ground level. Loading is accomplished by moving the tractor forwardly to project the tines 52 of the fork assembly 51 beneath the load which is to be raised. Because different loads may present different attitudes to the lift truck, the hydraulic ram 30 may be operated to pivot the vertical mast 50 about the axis of pins 54 to raise and lower the forward end of the tines 52 of the fork assembly 51 to easily work the tines 52 beneath the load which is to be raised. It may be seen that in forcing the tines 52 of the fork assembly 51 beneath a load, the reaction force of any load on the fork assembly 51 is transmitted rearwardly to the tractor through the frame 40 and the links 46. This unique construction provides an efficient and well-balanced arrangement for a fork lift truck.

Upon the reception of a load on the fork assembly 51, the hydraulic ram 30 may be partially retracted to insure against any toppling of the load from the forward end of the fork assembly 51, and the fork assembly 51 may then be raised in the vertical mast 50 to a convenient carrying position. The loaded fork assembly may then be transported to a remote location for depositing of the load. For depositing or stacking of a load the fork assembly may be raised to any height within the vertical limits of the mast 50. Further the mast 50 can be pivoted forwardly to dump a load. The use of the hydraulic ram 30 of the loader structure in the construction and assembly of the fork lift truck as described above provides a simple, efficient, and novel arrangement of a highly versatile fork lift truck construction.

Figure 4:
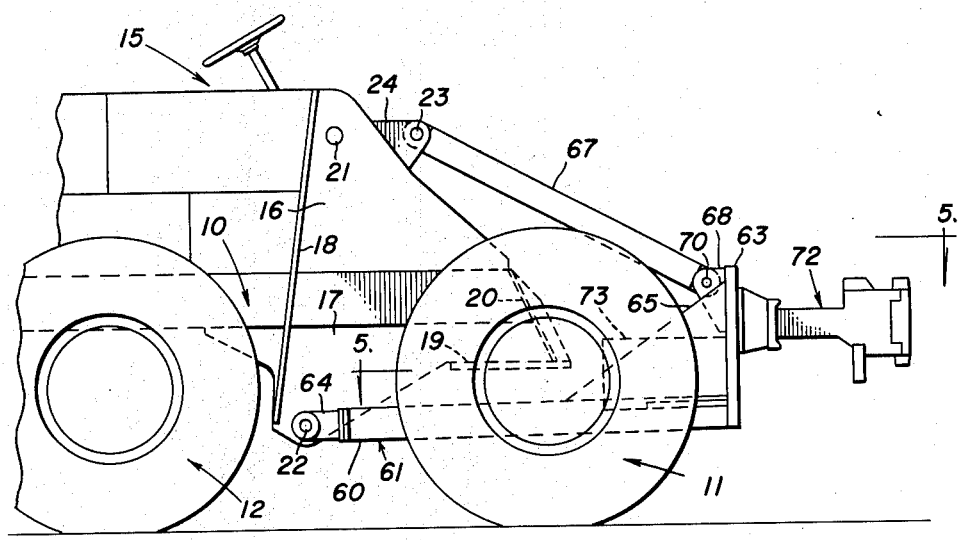
FIGURE 4 is a view similar to FIGURE 1 but showing a front-end pusher structure substituted for the loader structure of FIGURE 1.
Figure 5:
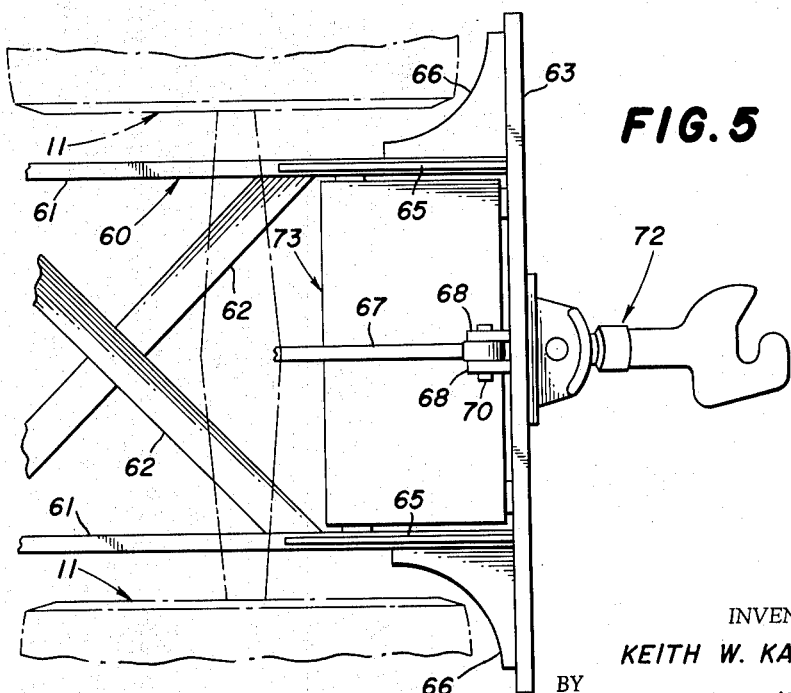
FIGURE 5 is an enlarged partial view of the structure shown in FIGURE 4 and taken substantially along the line 5—5 of FIGURE 4.

In the front-pusher vehicle arrangement shown in FIGURES 4 and 5, all of the loader structure of FIGURE 1 has been removed by a disconnection of the loader structure at pins 21, 22 and 23.

The basic support for the front-pusher structure comprises a frame 60, which is similar in arrangement to the frame 40 of the fork-lift truck construction. The frame 60 comprises a pair of transversely spaced apart beams 61 which are interconnected by a pair of crossed braces 62 and a vertical pusher plate 63. The crossed braces 62 position the beams 60 in a transversely spaced apart relationship which is substantially equal to the transverse spacing between the pins 22. The rearward end of each beam 60 is provided with a flange 64. Each flange 64 is journaled on one of the pins 22 on the tractor. The frame 60 extends forwardly from the pins 22 between the forward wheels 11 and beneath the axle assembly for the forward wheels 11.

The pusher plate 63 is a substantially rectangular plate and is secured to the forward end of the beams 61 to extend vertically upwardly therefrom. The upwardly extending portion of the pusher plate 63 is braced by a pair of triangular plates 65. Each triangular plate 65 is secured in a substantially upright position to the upper side of one of the beams 61 and to the rearward side of the pusher plate 63. The pusher plate 63 is further braced relative to the beams 61 by a pair of web members 66. Each of the web members 66 is secured in a substantially horizontal position to the outer side of one of the beams 61 and the rearward side of the pusher plate 63.

The forward end of the frame 60 is supported in a substantially horizontal position beneath the axle assembly for the forward wheels 11 by a link 67. One end of the link 67 is pivotally connected between and to a pair of flanges 68 by a pin 70. The pair of flanges 68 are secured in a transverse spaced apart relationship to each other on the rearward side and at the transverse center of the pusher plate 63. The other end of the link 67 is connected to the flange assembly 24 on the tractor by the pin 23.

Although not shown in FIGURES 4 and 5, additional links similar to link 67, or in substitution thereof, may be provided between the rearward side of the pusher plate 63 and the pins 21 on the tractor.

The forward side of the pusher plate 63 is provided with a railroad car coupler assembly 72. The coupler 72 is carried at a height corresponding to the normal vertical position of couplers on railroad cars.

To aid in providing adequate traction between the forward wheels 11 and the ground when the forward wheels 11 are driven wheels, a ballast assembly 73 is provided. The ballast assembly 73 is carried on the forward portion of the frame 60 rearwardly of the pusher plate 63 by any suitable support members secured to the frame 60.

The above described front-pusher vehicle is also operated by an operator from the operator's compartment 15 of the tractor through selected movements of the tractor and appropriate connections of the coupler 72 to the corresponding couplers of railroad cars. When the coupler 72 is connected to a railroad car coupler, a railroad car may be pushed or pulled by the pushing and pulling power of the tractor in the operation thereof. The relative position of the pins 23 and 22, and the alignment and arrangement of the front-pusher structure provide for an efficient combination of a front-pusher vehicle for moving railroad cars.

Having described the invention what is considered new and desired to be protected by Letters Patent is:

1. An assembly for mounting an attachment to a four-wheeled tractor having a first pair of pin means on opposite sides thereof between the forward and rearward wheels, a second pair of pin means carried on opposite sides of said tractor between the forward and rearward wheels and substantially above said first pin means, and a fifth pin means carried on said tractor substantially at the transverse center thereof and forwardly of said second pair of pin means, said assembly comprising a frame mounted on said first pair of pin means, a pair of links mounted at one end on said second pair of pin means and attached at their other ends to said frame, a hydraulic ram mounted on said fifth pin means and pivotally connected to said attachment, and mounting means on the forward end of said frame for pivotally securing said attachment to said frame.

2. An assembly for mounting an attachment to a four-wheeled tractor having a first pair of pin means on opposite sides thereof and between the forward and rearward wheels, a second pair of pin means carried on opposite sides of said tractor between the forward and rearward wheels and substantially above said first pin means, and fifth pin means carried on said tractor substantially at the transverse center thereof and forwardly of said second pair of pin means, said assembly comprising a frame mounted on said first pair of pin means and extending substantially horizontally and forwardly of said tractor, link means connected at one end to one of said second and fifth pin means and at the other end to said frame, and mounting means on said frame for supporting said attachment.

References Cited by the Examiner

UNITED STATES PATENTS

| 2,235,913 | 3/1941 | Beane | 214—140 |
|---|---|---|---|
| 2,304,282 | 12/1942 | Ross | 214—131 |
| 2,411,556 | 11/1946 | Schroeder | 214—672 |
| 2,505,639 | 4/1950 | Eaton | 214—131 |
| 2,522,583 | 9/1950 | Remington. | |
| 2,622,500 | 12/1952 | Hugger. | |
| 2,630,052 | 3/1953 | Jory | 172—611 X |
| 2,634,873 | 4/1953 | Tedrow | 213—130 |
| 2,730,250 | 1/1956 | Harrison | 213—131 |
| 2,754,020 | 7/1956 | Dunn et al. | 214—674 |
| 2,820,561 | 1/1958 | Meagher | 214—620 |
| 2,986,292 | 5/1961 | Kampert et al. | 214—140 |

FOREIGN PATENTS

| 628,073 | 9/1961 | Canada. |
|---|---|---|
| 824,241 | 11/1959 | Great Britain. |

HUGO O. SCHULZ, *Primary Examiner.*